US011670047B2

United States Patent
Das et al.

(10) Patent No.: US 11,670,047 B2
(45) Date of Patent: Jun. 6, 2023

(54) SYSTEM AND METHOD FOR INTEGRATING OBJECTS IN MONOCULAR SLAM

(71) Applicant: Tata Consultancy Services Limited, Mumbai (IN)

(72) Inventors: Dipanjan Das, Kolkata (IN); Brojeshwar Bhowmick, Kolkata (IN); Aniket Pokale, Telangana (IN); Krishnan Madhava Krishna, Telangana (IN); Aditya Aggarwal, Telangana (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 114 days.

(21) Appl. No.: 16/918,743

(22) Filed: Jul. 1, 2020

(65) Prior Publication Data

US 2021/0042996 A1 Feb. 11, 2021

(30) Foreign Application Priority Data

Jul. 2, 2019 (IN) .............................. 201921026453

(51) Int. Cl.
*G06T 17/05* (2011.01)
*G06T 7/55* (2017.01)
(Continued)

(52) U.S. Cl.
CPC .............. *G06T 17/05* (2013.01); *G06T 7/174* (2017.01); *G06T 7/55* (2017.01); *G06T 7/75* (2017.01);
(Continued)

(58) Field of Classification Search
CPC .. G06T 17/05; G06T 7/55; G06T 7/77; G06T 7/75; G06T 7/174; G06T 15/04;
(Continued)

(56) References Cited

U.S. PATENT DOCUMENTS 10,659,768 B2 * 5/2020 Feng ....................... G06T 7/579

FOREIGN PATENT DOCUMENTS

CN 108682027 A 10/2018

OTHER PUBLICATIONS

Maity et al., "Edge SLAM: Edge Points Based Monocular Visual SLAM", Oct. 2017, IEEE, International Conference on Computer Vision Workshops, p. 2408-2417. (Year: 2017).*

(Continued)

*Primary Examiner* — Vincent Rudolph
*Assistant Examiner* — Timothy Choi
(74) *Attorney, Agent, or Firm* — Finnegan, Henderson, Farabow, Garrett & Dunner LLP

(57) ABSTRACT

The embodiments herein provide a system and method for integrating objects in monocular simultaneous localization and mapping (SLAM). State of art object SLAM approach use two popular threads. In first, instance specific models are assumed to be known a priori. In second, a general model for an object such as ellipsoids and cuboids is used. However, these generic models just give the label of the object category and do not give much information about the object pose in the map. The method and system disclosed provide a SLAM framework on a real monocular sequence wherein joint optimization is performed on object localization and edges using category level shape priors and bundle adjustment. The method provides a better visualization incorporating object representations in the scene along with the 3D structure of the base SLAM system, which makes it useful for augmented reality (AR) applications.

3 Claims, 8 Drawing Sheets

(51) Int. Cl.
*G06T 7/77* (2017.01)
*G06T 7/73* (2017.01)
*G06T 7/174* (2017.01)
*G06T 15/04* (2011.01)

(52) U.S. Cl.
CPC .............. *G06T 7/77* (2017.01); *G06T 15/04* (2013.01); *G06T 2207/10021* (2013.01); *G06T 2207/30241* (2013.01); *G06T 2207/30244* (2013.01)

(58) Field of Classification Search
CPC . G06T 2207/10021; G06T 2207/30241; G06T 2207/30244
See application file for complete search history.

(56) References Cited

OTHER PUBLICATIONS

Parkhiya et al., "Constructing Category-Specific Models for Monocular Object-SLAM", May 2018, IEEE, International Conference on Robotics and Automation, p. 4517-4524. (Year: 2018).*
Fiario et al., "Joint Detection, Tracking and Mapping by Semantic Bundle Adjustment", Oct. 2013, IEEE, Conference on Computer Vision and Pattern Recognition, p. 1538-1545. (Year: 2013).*
Ramadasan et al., "Dcslam: A Dynamically Constrained Real-Time Slam", Sep. 2015, IEEE, 2015 IEEE International Conference on Image Processing (ICIP), p. 1130-1134. (Year: 2015).*
Hartley et al., "Triangulation", Sep. 1995, Springer-Verlag, Computer Analysis of Images and Patterns CAIP'95 Proceedings, LNCS 970, p. 190-197. (Year: 1995).*
Pereira et al., "A Novel Resection-Intersection Algorithm With Fast Triangulation Applied to Monocular Visual Odometry", Nov. 2018, IEEE, Transactions on Intelligent Transportation Systems, vol. 19, No. 11, p. 3584-3593. (Year: 2018).*
Haner et al., "Covariance Propagation and Next Best View Planning for 3D Reconstruction", Oct. 2012, Springer-Verlag, European Conference on Computer Vision, ECCV 2012, Part II, LNCS 7573, p. 545-556. (Year: 2012).*
Fioraio, N. et al. (2013), "Joint Detection, Tracking and Mapping by Semantic Bundle Adjustment," 2013 IEEE Conference on Computer Vision and Pattern Recognition, retrieved from http://openaccess.thecvf.com/content cvpr 2013/papers/Fioraio Joint Detection Tracking 2013 CVPR paper.pdf (8 pages).
Engelmann, F. et al. (2016), "Joint Object Pose Estimation and Shape Reconstruction in Urban Street Scenes Using 3D," GCPRr 2016—computer science, retrieved from http://web-info8.informatik.rwth-aachen.de/media/papers/EngelmannGCPR16.pdf (8 pages).
Strasdat, H. et al. (2010), "Scale Drift-Aware Large Scale Monocular SLAM," Robotics: Science and Systems, retrieved from http://roboticsproceedings.org/rss06/p10.pdf (8 pages).
Song, S. et al. (2015), "Joint SFM and Detection Cues for Monocular 3D Localization in Road Scenes," IEEE Conference on Computer Vision and Pattern Recognition (CVPR), retrieved from http://cseweb.ucsd.edu/~mkchandraker/pdf/cvpr15_Jointsfmdetection.pdf (9 pages).

* cited by examiner

Sequence 1

Sequence 2

Sequence 3

SYSTEM AND METHOD FOR INTEGRATING OBJECTS IN MONOCULAR SLAM

PRIORITY CLAIM

The present application claims priority from Indian provisional patent application no. IN-201921026453, filed on Jul. 2, 2019. The entire contents of the aforementioned application are incorporated herein by reference.

TECHNICAL FIELD

The disclosure herein generally relates to field of robotics and more particularly to system and method for integrating objects in monocular simultaneous localization and mapping (SLAM).

BACKGROUND

In computer vision application Simultaneous Localization and Mapping (SLAM) is the most vital cog in various mobile robotic applications involving ground robots, aerial and under water vehicles. Monocular SLAM has emerged as a popular choice given its light weight and easy portability, especially in restrictive payload systems such as micro aerial vehicles (MAV) and handheld camera platforms. Real-time monocular SLAM has increasingly become a popular research topic.

Existing visual based SLAM includes parallel tracking and mapping (PTAM) which uses fast corners points as features and provides simple methods for camera estimation and map generation by decoupling localization and mapping modules. However, in less textured environments these features are not in abundance and hence leads to a loss in feature tracking and thus SLAM failure. Conventional feature-based visual SLAMs are vulnerable to erroneous pose estimates due to insufficient tracking of mapped points or motion induced errors such as in large or in-place rotations. Further in the existing monocular SLAM systems, the camera track tends to break in conditions with abrupt motion which leads to reduction in the number of 2D point correspondences. Current works on SLAM uses planes and edges respectively as feature space for optimizing the SLAM problem, but the latter edge based method suffers drift due to inaccuracies in optical flow in cases like abrupt motion.

Object SLAM is a relatively new paradigm wherein SLAM information is augmented with objects in the form of its poses to achieve more semantically meaningful maps with the eventful objective of improving the accuracy of SLAM systems. Object SLAM presents itself in two popular threads. In first, instance specific models are assumed to be known a priori. In the second, a general model for an object is used such as ellipsoids and cuboids. However, these generic models just give the label of the object category and do not give much information about the object pose in the map.

SUMMARY

Embodiments of the present disclosure present technological improvements as solutions to one or more of the above-mentioned technical problems recognized by the inventors in conventional systems. For example, in one embodiment, a method for integrating objects in monocular simultaneous localization and mapping (SLAM) is provided.

The method comprises receiving an input image sequence of an area of interest captured by an image sensing device.

Further comprises performing steps for bundle adjustment, the steps comprising: a) identifying a plurality of key frames in the input image sequence based on edge correspondences of 2D points between successive images frames in the input image sequence; b) determining initial pose of the image sensing device by obtaining rotation and translation of a second key frame with respect to a first key frame from the plurality of key frames; c) determining an initial 3D map of the area of interest using the initial pose, wherein the initial 3D map provides a plurality of initial 3D points; d) obtaining a plurality of successive initial poses of the image sensing device based on a resection technique that utilizes the initial 3D map and edge correspondences of the 2D Points in each of successive key frames among the plurality of key frames; e) determining initializations of a plurality of successive 3D points for each of the successive keyframes using a triangulation technique, wherein the triangulation technique determines associated each of the edge correspondences between the 2D points of each of the successive key-frames; and f) performing the bundle adjustment for the SLAM based on the initializations of the plurality of successive 3D points and the plurality of successive initial poses.

Furthermore, the method comprises simultaneously performing objection detection on the input image sequences using bounding box based cropping technique on objects in the input image sequences, key point detection of the objects and wireframe model fitting to the key points of the objects to obtain a plurality of shape parameters of the objects and a plurality of poses corresponding to each of the plurality of objects detected in the input image sequence.

Furthermore, the method comprises perform a joint optimization by minimizing a resultant cost function to generate an optimized 3D map of the area of interest, wherein joint optimization comprises adding constraints to the bundle adjustment by integrating the plurality of objects in the SLAM by applying the plurality of shape parameters of the objects and the plurality of poses corresponding to each of the plurality of objects detected in the input image sequence.

In another aspect, a system for integrating objects in monocular simultaneous localization and mapping (SLAM) is provided. The system comprises a memory storing instructions; one or more Input/Output (I/O) interfaces; and one or more hardware processor(s) coupled to the memory via the one or more I/O interfaces, wherein the processor(s) is configured by the instructions to receiving an input image sequence of an area of interest captured by an image sensing device.

Further the one or more hardware processors are configured to perform steps for bundle adjustment, the steps comprising: a) identifying a plurality of key frames in the input image sequence based on edge correspondences of 2D points between successive images frames in the input image sequence; b) determining initial pose of the image sensing device by obtaining rotation and translation of a second key frame with respect to a first key frame from the plurality of key frames; c) determining an initial 3D map of the area of interest using the initial pose, wherein the initial 3D map provides a plurality of initial 3D points; d) obtaining a plurality of successive initial poses of the image sensing device based on a resection technique that utilizes the initial 3D map and edge correspondences of the 2D Points in each of successive key frames among the plurality of key frames; e) determining initializations of a plurality of successive 3D points for each of the successive keyframes using a triangulation technique, wherein the triangulation technique determines associated each of the edge correspondences between the 2D points of each of the successive key-frames; and f) performing the bundle adjustment for the SLAM based on the initializations of the plurality of successive 3D points and the plurality of successive initial poses.

Furthermore, the one or more hardware processors are configured to simultaneously perform objection detection on the input image sequences using bounding box based cropping technique on objects in the input image sequences, key point detection of the objects and wireframe model fitting to the key points of the objects to obtain a plurality of shape parameters of the objects and a plurality of poses corresponding to each of the plurality of objects detected in the input image sequence.

Furthermore, the one or more hardware processors are configured to perform a joint optimization by minimizing a resultant cost function to generate an optimized 3D map of the area of interest, wherein joint optimization comprises adding constraints to the bundle adjustment by integrating the plurality of objects in the SLAM by applying the plurality of shape parameters of the objects and the plurality of poses corresponding to each of the plurality of objects detected in the input image sequence.

In yet another aspect, they are provided one or more non-transitory machine-readable information storage mediums comprising one or more instructions, which when executed by one or more hardware processors causes a method for integrating objects in monocular simultaneous localization and mapping (SLAM). Further, the method comprises receiving an input image sequence of an area of interest captured by an image sensing device.

Further comprises performing steps for bundle adjustment, the steps comprising: a) identifying a plurality of key frames in the input image sequence based on edge correspondences of 2D points between successive images frames in the input image sequence; b) determining initial pose of the image sensing device by obtaining rotation and translation of a second key frame with respect to a first key frame from the plurality of key frames; c) determining an initial 3D map of the area of interest using the initial pose, wherein the initial 3D map provides a plurality of initial 3D points; d) obtaining a plurality of successive initial poses of the image sensing device based on a resection technique that utilizes the initial 3D map and edge correspondences of the 2D Points in each of successive key frames among the plurality of key frames; e) determining initializations of a plurality of successive 3D points for each of the successive keyframes using a triangulation technique, wherein the triangulation technique determines associated each of the edge correspondences between the 2D points of each of the successive key-frames; and f) performing the bundle adjustment for the SLAM based on the initializations of the plurality of successive 3D points and the plurality of successive initial poses.

Furthermore, the method comprises simultaneously performing objection detection on the input image sequences using bounding box based cropping technique on objects in the input image sequences, key point detection of the objects and wireframe model fitting to the key points of the objects to obtain a plurality of shape parameters of the objects and a plurality of poses corresponding to each of the plurality of objects detected in the input image sequence.

Furthermore, the method comprises perform a joint optimization by minimizing a resultant cost function to generate an optimized 3D map of the area of interest, wherein joint optimization comprises adding constraints to the bundle adjustment by integrating the plurality of objects in the SLAM by applying the plurality of shape parameters of the objects and the plurality of poses corresponding to each of the plurality of objects detected in the input image sequence.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
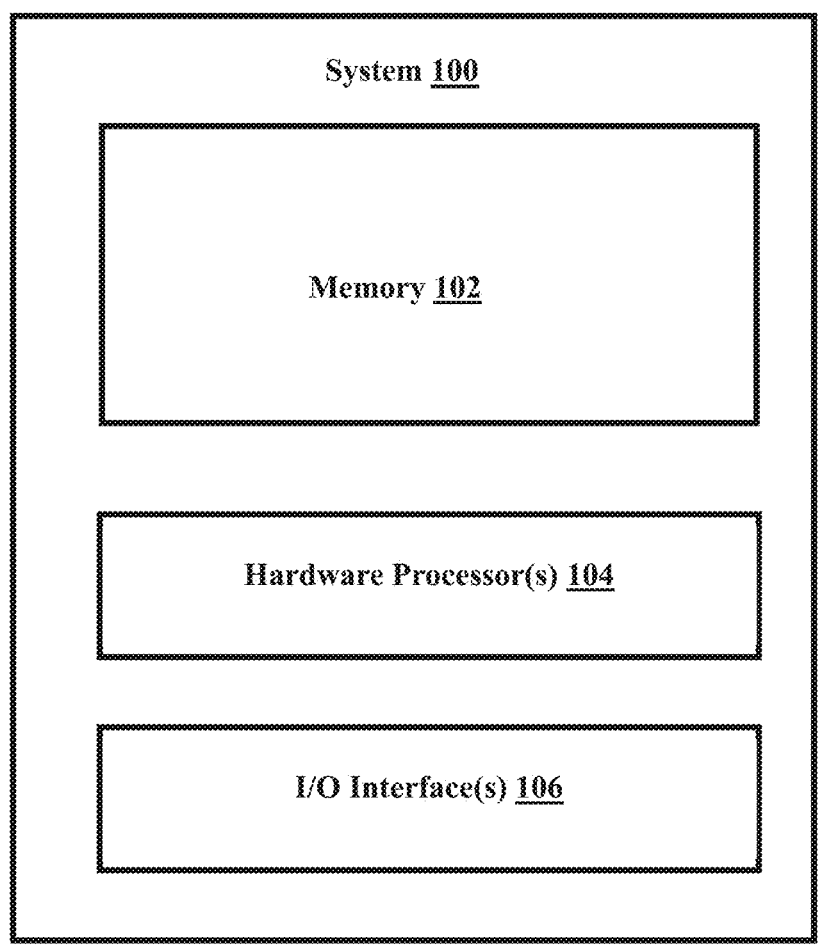
FIG. 1 illustrates an exemplary block diagram of a system for integrating objects in monocular simultaneous localization and mapping (SLAM), in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide a system and method for integrating objects in monocular simultaneous localization and mapping (SLAM). The method and system disclosed provides a SLAM framework on a real monocular sequence wherein joint optimization is performed on object localization and edges using category level shape priors and bundle adjustment. The method provides a better visualization incorporating object representations in the scene along with the 3D structure of the base SLAM system, which makes it useful for augmented reality (AR) applications.

Referring now to the drawings, and more particularly to FIG. 1 through FIG. 5C, where similar reference characters denote corresponding features consistently throughout the figures, there are shown preferred embodiments and these embodiments are described in the context of the following exemplary system and/or method.

FIG. 1 illustrates an exemplary block diagram of a system 100 for integrating objects in monocular simultaneous localization and mapping (SLAM), in accordance with some embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

Figure 2:
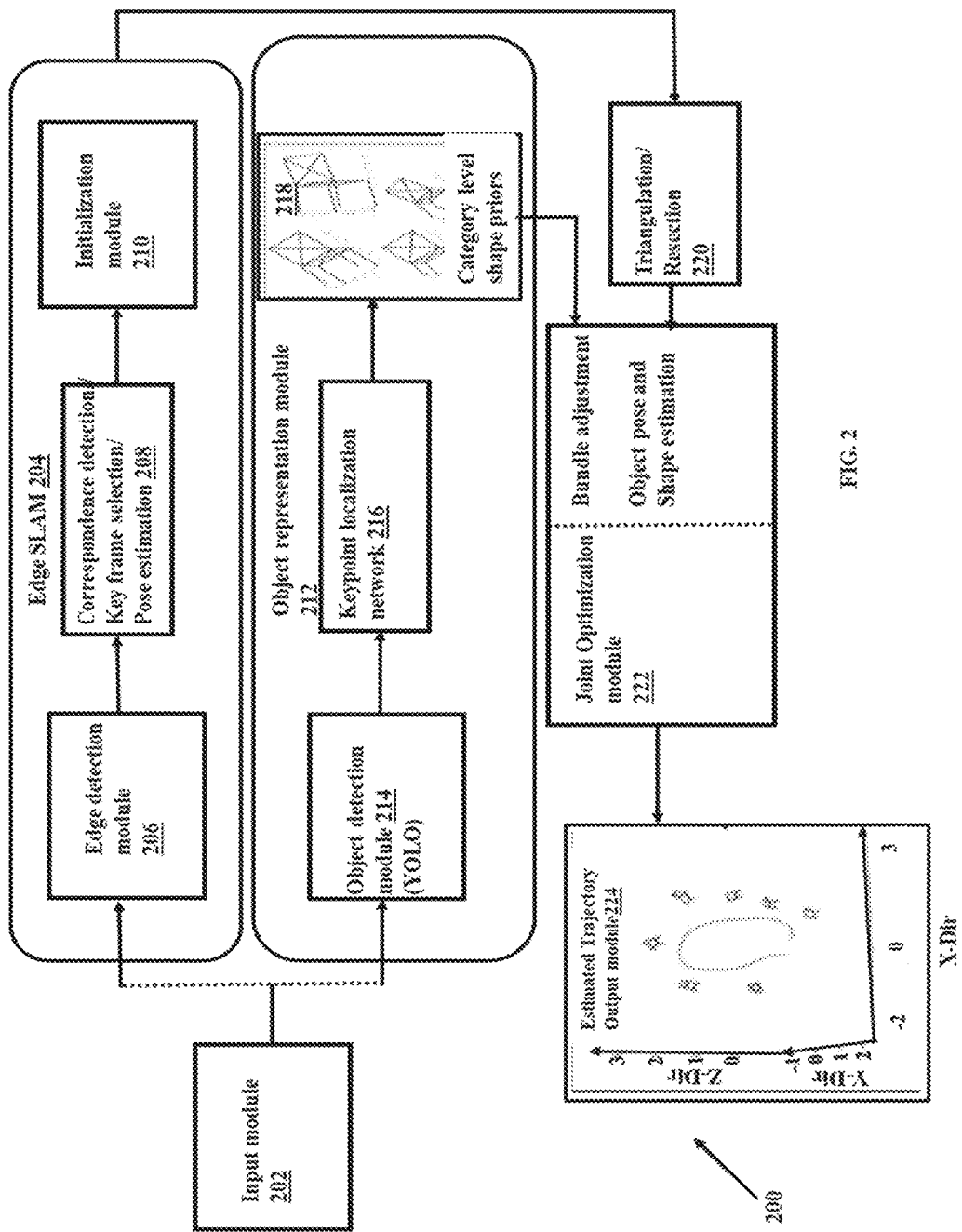
FIG. 2 illustrates an architectural diagram of the system of FIG. 1 for integrating objects in the monocular simultaneous localization and mapping (SLAM), in accordance with some embodiments of the present disclosure.

The memory 102 includes plurality of modules (not shown) such as modules depicted in the architecture of the system 100 in FIG. 2. Each of the modules will be executed by the hardware processors 104 to implement the respective functions of the modules for integrating objects in monocular SLAM.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method 200 by the one or more processors 104.

FIG. 2 illustrates an architectural diagram 200 of the system 100 for integrating objects in monocular simultaneous localization and mapping (SLAM), in accordance with some embodiments of the present disclosure. In an embodiment, the system 100 can be a drone equipped with an image sensing device such as a camera capturing an input image sequence. However, it can be understood by a person skilled in the art that the drone is an example system and the system 100 represents any system that deploys monocular SLAM. The architecture 200 of the system 100 (alternately referred to as drone) includes three functional blocks. First functional block is an edge SLAM module 204 providing initializations of the plurality of successive 3D points and a plurality of successive initial poses of the image sensing device, which are derived from keyframes identified from the input image sequence received from the camera. The second functional block, an object representation module 212, performs object detection and object pose estimation. Finally the third functional block, a joint optimization module 222, receives processed data from the edge SLAM 204 and the object representation module 212 and performs a joint optimization module 222 by adding constraints to a bundle adjustment by integrating a plurality of objects detected by the object representation module 212 in the edge SLAM 204 by applying detected plurality of shape parameters of the objects and plurality of poses corresponding to each of the plurality of objects detected in the input image sequence by the object representation module 212.

As depicted in FIG. 2 the edge simultaneous localization and mapping (SLAM) pipeline or module 204 further includes an edge detection module 206, a correspondence detection/key frame selection/pose estimation module 208, and an initialization module 210. The object representation module 212 further includes an object detection module 214, a key point localization network 216 and a category level shape priors 218.

Referring to the FIG. 2, an input module 202 is configured to provide input image sequence to the edge simultaneous localization and mapping (SLAM) and object representation module 212, alternatively referred as object detection pipeline 212. For example, the input sequence of images can be from video taken by the drone moving in an indoor room. The edge detection module 206 of the system 200 is configured to detect edges of the input frame for all image frames received in the input image sequence comprising a first frame, a second frame and so on. Further the received frames are analyzed by the correspondence detection/key frame selection/pose estimation module 208, which is configured to:
  a) Perform correspondence detection by associating the edges in the two successive image frame (first frame and second frame).
  b) Declare or determine whether a current frame (second frame) is a key frame or not with respect to the first frame. The correspondence (edge correspondence herein) is determined based on a predefined set of parameters. If current frame is not identified as the key frame, next frame (successive frame to the second frame) is considered for correspondence detection. The key frame refers to a frame from a subset of frames selected from the sequence of image frames. The subset of frames, interchangeably referred as key frames, is selected such that they enable increase the processing speed by selecting only significant or informative frames.
  c) Once key frame is identified the correspondence detection/key frame selection/pose estimation module 208 is configured to estimate a pose of the image sensing device, interchangeably referred as camera pose, between the two frames wherein rotation and translation of the second frame (identified as the key frame) or camera with respect to the first frame. Further, using the pose between the two frames initial 3D structure or 3D map (also referred as 'initialization') is obtained. Further the obtained camera pose is be used for initialization of an optimization framework. The formulation of pose and 3D structure estimation of Edge SLAM is described below, wherein two key frames are defined as covisible key frames only if they have 100 common visible 3D points. Further C⊆U is chosen, where U is the set of a plurality of key frames identified in the input image sequence, C contains a new key frame Km and its covisible key frames. The bundle adjustment formulation is shown below using a first cost function:

$$\text{cost1} = \min_{C_j, B_i} \sum_{i=1}^{n} \sum_{j=1}^{m} V_{ij} D(P(C_j, B_i), x_{ij} \Psi(x_{ij})) \tag{1}$$

where, $V_{ij} \in \{0, 1\}$ is the visibility of the $i^{th}$ 3D point in the $j^{th}$ camera, P is the function which projects a 3D point $B_i$ onto camera $C_j$ which is modelled using 7 parameters (1 for focal length, 3 for rotation, 3 for position), $x_{ij}$ is the actual projection of the $i^{th}$ point on to the $j^{th}$ camera. $\Psi(x_{ij}) = 1 + r\|x_{ij}\|^2$ is the radial distortion function with single parameter (r) and D is the Euclidean distance. Further, the focal length of the camera is fixed using the known internal calibration parameters and equation 1 is minimized using the bundle adjustment framework. Further, once the initial 3D structure is obtained, select the next frame and estimate the correspondences between the 3D and 2D edge points in the new key frame along with new 2D-2D edge correspondences to find new edges in the key frame which were not there in the 3D map.

Referring back to the FIG. 2, simultaneously along with the edge slam pipeline 204, the input data (input image sequence captured by the drone), are received by the input module 202 and provided to the object detection pipeline module 212. The object detection module 212 is configured to detect objects in received in each frame of the input image sequence. Further, every frame in the input image sequence is passed to the object detection pipeline 212 to check if there is an object in that frame. A YOLO 9000™ detection algorithm (a deep learning convolutional neural network) is used, which gives the bounding boxes on the objects in the images. Further the images are cropped by the bounding boxes and passed to a stacked Hourglass Network™, which gives key-points on object. The category level shape priors module 218 is configured to get shape parameters of the objects which can further be used to find the pose of the object. The category level shape prior's module 218 uses a mean wireframe model, which can be deformed by varying certain parameters (category level shape priors) wherein an attempt is made to fit this wireframe model to the key-points of the object (each corner of the model should match to a key-point). The parameters obtained are the shape parameters that define the shape of the object. Further, using this process the pose of the object with respect to the camera is also obtained. Further in the object feature extraction process, the category level models rely on key points for that category, for which stacked Hourglass™ network is used. The hourglass network is trained using the data, which further uses rendering pipeline for this process which is a customized version of RenderForCNN. Using this, huge amounts of synthetic key point annotated chair images are generated using a small set of 3D annotated key points. The advantage of this method is that only 2D annotations are required, eliminating the need for 3D annotations on CAD models, annotations will be available for occluded parts, and using only a small amount of training data, millions of training examples can be generated for the CNN.

Further in the object measurement using the category models process, equation 2 represents incorporating, in the SLAM, 2D key points of the objects that are learnt and the 3D key points from 2D from a single image are obtained by using the shape and pose scheme proposed. Further it is assumed that the $SE_3$ pose (in the world frame) of each camera is denoted by Cj and from the jth pose, the robot observes M objects where the $SE_3$ pose of each object observation m with respect to camera j is denoted by $\hat{T}_j^{Om}$. Further the $SE_3$ pose (in world frame) of each object observation m in the set is indexed as $T^{Om}$ and we denote the number of key points in the object category by K wherein the kth key point of the $m^{th}$ object observed are denoted by $S_k^m$. When an object is seen for the first time, run the single view object pose-shape optimization which gives the shape parameters of the object and the pose of the object with respect to the corresponding camera wherein the shape and pose optimization is done by solving for the following formulation:

$$\min_{\hat{T}_j^{Om}, \Lambda_m} \left( \sum_{m=1}^{M} \sum_{k=1}^{K} \left\| \pi\left(K \hat{T}_j^{Om}(S + V \Lambda_m)\right) - s_k^m \right\|_2^2 \right) + \rho(\Lambda_m) \tag{2}$$

Further solving for the above gives formulation gives an estimate of the shape parameters ($\Lambda m$) of the object m and the pose of that object ($\hat{T}_j^{Om}$) with respect to that particular camera (single-view pose) and from this single-view pose, the global pose of the object ($SE_3$ pose in world frame) is obtained where this is done only once per object. To get the pose in world frame, following formula is used:

$T^{Om} = C_j \hat{T}_j^{Om}$

Referring to the FIG. 2, the triangulation/resection module 220 of the system 200 is configured to perform the process of resection on the 3D-2D correspondences to get the new key frame pose using the 3D-2D correspondences and triangulation on the new key frame pose to get new 3D points in the map using the pose of the new key frame and new 2D-2D correspondences, which will add new points in the map every time new edges are encountered. Further, in accordance with the resection process, consider there are two images where there are 3D points corresponding to the 2D edge points in the two images where in the second image 2D edge points corresponding to the 3D map edge points are present and given the pose of the first frame, 3D map points and 3D-2D correspondences between the 3D map points and the 2nd frame 2D edge points, the pose of the 2nd frame is obtained. Further, in accordance with the triangulation process, consider there are two frames where the relative pose between them is known, the feature points in both the images are detected and the correspondences between the 2D image points are estimated. The 3D map points is obtained using the 2D-2D correspondences and the relative pose between the frames.

Referring to the FIG. 2, the joint optimization module 222 of the system 200 is configured to optimize for all the 3D map points the key frame poses, and the objects shape parameters. The optimization method of the 3D map points and the camera poses is called 'bundle adjustment' along with which the optimization method of fitting a wireframe model to each object i.e. the image under 'Joint optimization' is solved. The inputs to the joint optimization module 222 are the 3D map edge points, key frame poses and the object key-points. Further in the joint bundle adjustment process, object constraints are added to the bundle adjustment back-end of edge SLAM, resulting in a joint bundle adjustment where the object pose and shape is obtained by assuming them as 3D wireframes along with the camera poses and 3D edge structure. Existing linear subspace model uses shape parameters to deform a mean shape of the object where the shape parameters define the linearly independent directions (basis vectors) which are unique for each object. Thus, every new object of the category encountered has a unique set of shape parameters. Hence, optimizing these shape parameters is referred to as optimizing for the shape of the object for simplicity purposes. Further, the 3K vector comprising of the set of 3D locations of these K 3D points is denoted as S where S is considered as the mean shape of the category, and V is are a deformation basis obtained from PCA over a collection of aligned ordered 3D CAD models.

$$S = \overline{S} + \sum_{b=1}^{B} \lambda_b V_b = \overline{S} + V\Lambda \tag{3}$$

where B is the number of basis vectors (the top-B Eigen vectors after PCA), V represents the learned 3K×B deformation modes, and $\Lambda$ is a K vector containing the deformation coefficients (shape parameters). Varying the deformation coefficients produces various shapes from the learned shape subspace (as shown in FIG. 2 Category Level Shape Priors). Further the global pose of the object is optimized along with other parameters where the global pose of object along with shape aids in estimation of the edge SLAM trajectory and 3D structure. The shape and pose in world frame of each object can then be computed by minimizing the following key point re projection error, referred as second cost function.

$$\text{cost2} = \min_{C_j, T_j^{O_m}, \Lambda_m} \left( \sum_{m=1}^{M} \sum_{k=1}^{K} \left\| \pi(KC_j^{-1} T^{O_m}(\overline{S} + V\Lambda_m)) - s_k^m \right\|_2^2 \right) + \rho(\Lambda_m) \tag{4}$$

In the above equation 4, $\rho(\Lambda m)$ denotes the appropriate regularizers (such as L2 norm) to prevent the shape parameter ($\Lambda$) estimates from deviating too much from the category-model. Further, if the object has been associated across multiple frames, temporal consistency is exploited, wherein both the costs from edge pose, structure estimation and object estimation are added into a single optimization framework, alternatively referred as joint optimization in accordance to a resultant cost function, to minimize the current pose of the camera, the 3D structure, the pose of the chair and the shape of the object jointly. Hence the resultant cost function comprising the first cost function as in equation 1 and second cost function as in equation is optimized as below:

$$\min_{C_j, B_i, T_j^{O_m}, \Lambda_m} \text{cost1} + \text{cost2} \tag{5}$$

Further in the present disclosure, Ceres-Solver is used for solving joint optimization problem as local bundle adjustment is used, the last N frames are taken and solved locally wherein optimizing locally this way can produce scale drift, hence half of the last N frames is kept constant and optimize for the latest N/2 frames where N=10 are taken. Further, while running any SLAM, the reconstruction obtained is up to a scale. The optimization of objects is performed in Ceres and as a good initialization is needed for its converge to a better solution, the translation initialization method is used. This gives the initialization of the translation of the object with respect to the camera where in this method, the height and width of the bounding box are used to give an estimate of the translation. Let Tx, Ty, Tz be the translations in the x, y and z directions respectively with respect to the camera.

$$T'_z = k_x \times \frac{f_x}{w} \tag{6}$$

$$T''_z = k_y \times \frac{f_y}{h}$$

$$T_z = \frac{T'_z + T''_z}{2}$$

$$T_x = \left(x + \frac{w}{2} - u\right) \times \frac{T_z}{f_x} \tag{7}$$

$$T_y = \left(y + \frac{h}{2} - v\right) \times \frac{T_z}{f_y}$$

Here, x and y are the top left corner of bounding box, $f_x$, $f_y$, u, v are taken from camera matrix and h, w are the height and width of bounding box where $k_x$ and $k_y$ are constants obtained from mean 3D model. Further taking initialization of the rotation as identity seems to work reasonably fine in this case and once we get the initialization of the pose, the pose of the object m is obtained with respect to camera j i.e $\hat{T}_j^{O_m}$, but this pose will be up to a scale and this scale will be defined by the 3D CAD models (object-scale). Further, the Edge SLAM initialization and the object pose initialization have to be brought to the same scale. When an object is seen for the first time by the robot, the key points detected in the image will be taken at that time, and then track those key points using Kanade-Lucas-Tomasi feature tracker. Further tracking is be done as there is a need for stable points across multiple frames. Assume there is an Edge SLAM optimized trajectory and using this camera poses triangulation of the tracked key points is performed to get the object in 3D, which will be in the Edge SLAM-scale. Let $X_k^o$ be the kth 3D key point from a set of K key points in objects cale and Xe k be the same in the Edge SLAM-scale, the centroids of these sets of 3D points is calculated.

$$C^o = \frac{\sum_{k=1}^{K} X_k^o}{K} \tag{8}$$

$$C^e = \frac{\sum_{k=1}^{K} X_k^e}{K}$$

$$\text{scale} = \frac{C^e}{C_o}$$

where Co is the centroid of the 3D key points in the object-scale and Ce is the centroid in the Edge SLAM-scale wherein this scale is further used to bring the objects in the Edge SLAM scale for the joint optimization.

Figure 3A:
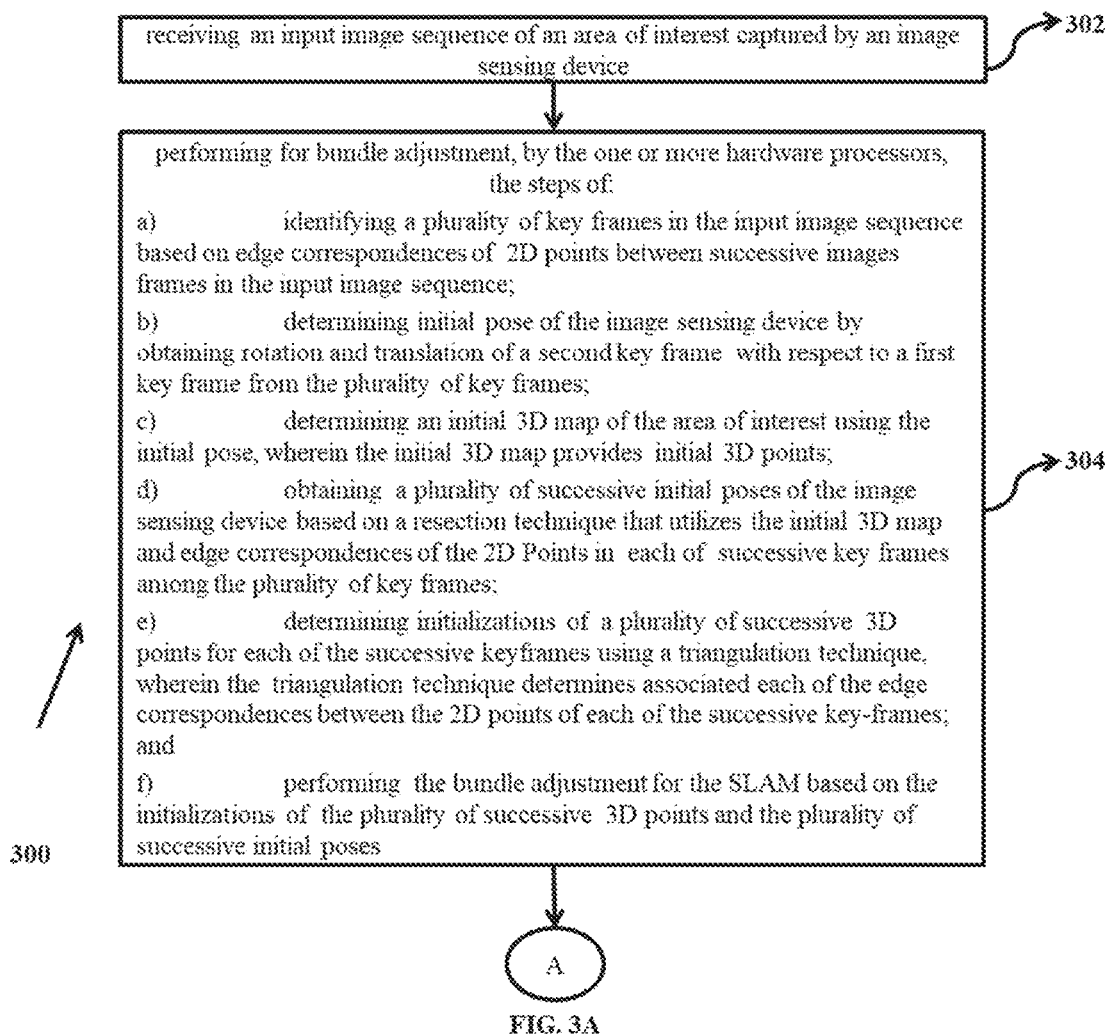
FIGS. 3A and 3B illustrate a flowchart of a method, implemented by the system of FIG. 1, illustrating the steps involved in integrating objects in monocular simultaneous localization and mapping (SLAM), in accordance with some embodiments of the present disclosure.
Figure 3B:
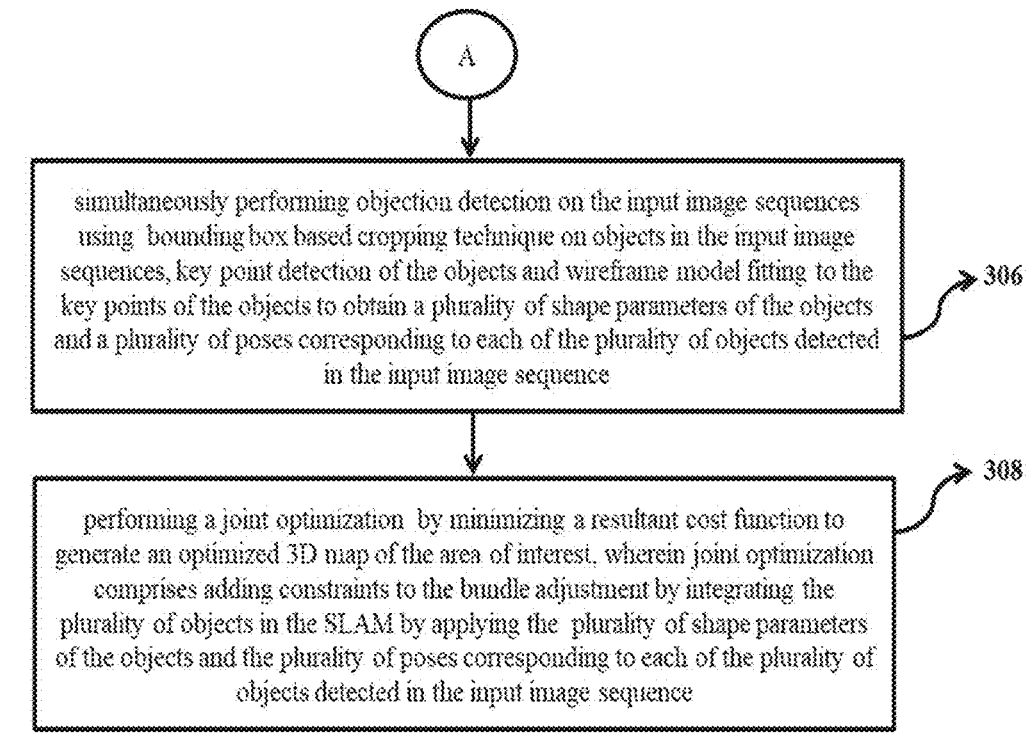

FIGS. 3A and 3B is a flowchart illustrating the steps involved in integrating objects in monocular simultaneous localization and mapping (SLAM), in accordance with some embodiments of the present disclosure.

The method disclosed is to be understood with respect to the steps 302 to 308 executed by the one or more hardware processors 104 in accordance to various modules of the architecture explained in the FIG. 2.

At step 302 of the method 300, the one or more hardware processors 104 are configured to receive an input image sequence of an area of interest captured by an image sensing device.

At step 304 of the method 300, the one or more hardware processors 104 are configured to perform steps of:

a) Identifying a plurality of key frames in the input image sequence based on edge correspondences of 2D points between successive images frames in the input image sequence. The key frame detection comprises detecting edges in a first frame and a second frame in the input image sequences, wherein the first image frame and the second image frames are successive image frames. Further, identifying whether the second frame is a key frame with respect to the first frame using correspondence detection based on a set of parameters; selecting a successive frame to the second frame for the key frame determination if the second frame is not identified as the key frame. Thereafter, repeating the key frame detection for all input image sequences to determine the plurality of key frames.

b) Determining initial pose of the image sensing device by obtaining rotation and translation of a second key frame with respect to a first key frame from the plurality of key frames;

c) Determining an initial 3D map of the area of interest using the initial pose, wherein the initial 3D map provides a plurality of initial 3D points.

d) Obtaining a plurality of successive initial poses of the image sensing device based on a resection technique that utilizes the initial 3D map and edge correspondences of the 2D Points in each of successive key frames among the plurality of key frames.

e) Determining initializations of a plurality of successive 3D points for each of the successive keyframes using a triangulation technique, wherein the triangulation technique determines associated each of the edge correspondences between the 2D points of each of the successive key-frames.

f) Performing a bundle adjustment for the SLAM based on the initializations of the plurality of successive 3D points and the plurality of successive initial poses.

At step 306 of the method 300, the one or more hardware processors are configured to simultaneously perform object detection on the input image sequences using bounding box based cropping technique on objects in the input image sequences, key point detection of the objects and wireframe model fitting to the key points of the objects to obtain a plurality of shape parameters of the objects and a plurality of poses corresponding to each of the plurality of objects detected in the input image sequence.

The objects ('chair' in example herein) are detected using YOLO object detection network which gives the bounding boxes on the objects in the images. The output of the YOLO™ (images cropped by the bounding box) to is provided to 'Stacked hourglass network'™, which gives the 10 key-points on chairs (as Depicted in FIG. 2 Object representation). A mean wireframe mode, which can be deformed by varying certain parameters (FIG. 2 category level shape priors) is selected. The wireframe model is then fit the 10 key-points of the chair (each corner of the model should match to a key-point). The parameters that are obtained are the shape parameters that define the shape of the chair. In this process we also get the pose of the chair with respect to the camera.

At step 308 of the method 300, the one or more hardware processors are configured to perform the joint optimization to generate an optimized 3D map of the area of interest. The joint optimization comprises adding constraints to the bundle adjustment by integrating the plurality of objects in the SLAM by applying the plurality of shape parameters of the objects and the plurality of poses corresponding to each of the plurality of objects detected in the input image sequence. The joint optimization comprises minimizing the resultant cost function (in equation 5) to integrate the plurality of objects in the SLAM, wherein the resultant cost function comprises:

a) The first cost function (as in equation 1) associated with the bundle adjustment for initializations of the plurality of successive 3D points and the plurality of successive initial poses.

b) The second cost function (as in equation 3) associated optimization of the shape parameters of the objects and the plurality of poses corresponding to each of the plurality of object.

Thus, object optimization (fitting of the wireframe model) is added to the 'Bundle adjustment' of edge SLAM providing jointly optimizing for the edge 3D points, camera poses, object shape parameters, object poses together in a single optimization framework provided by the system 100 and the method 300 disclosed herein.

Figure 4:
FIG. 4 shows an edge structure obtained after joint optimization involved in integrating objects in monocular simultaneous localization and mapping (SLAM), in accordance with some embodiments of the present disclosure.

FIG. 4 shows an edge structure obtained after joint optimization involved in integrating objects in monocular simultaneous localization and mapping (SLAM), in accordance with some embodiments of the present disclosure. Joint optimization is obtained by optimizing for all the 3D map points, the key frame poses, and the objects (Bundle adjustment) as a result, the optimized 3D map of edge points, key frame poses, object shape parameters and object poses are received as output.

Figure 5A:
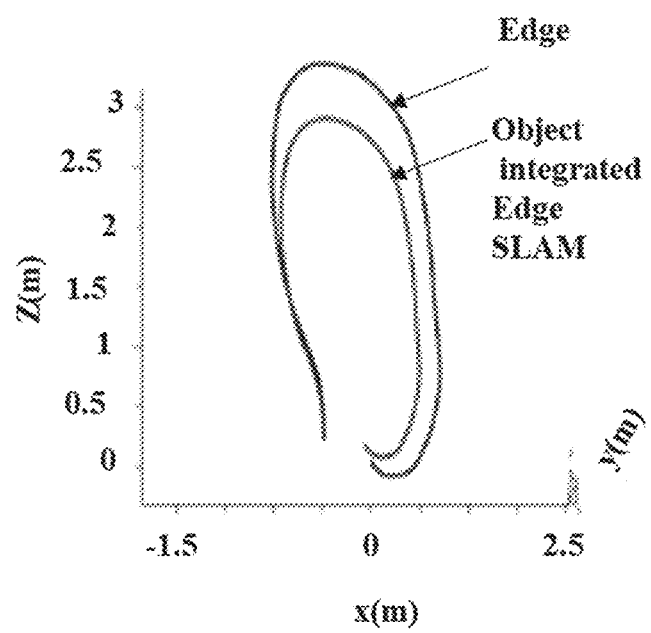
FIG. 5A through 5C illustrates a use case for integrating objects in monocular simultaneous localization and mapping (SLAM), in accordance with some embodiments of the present disclosure.
Figure 5B:
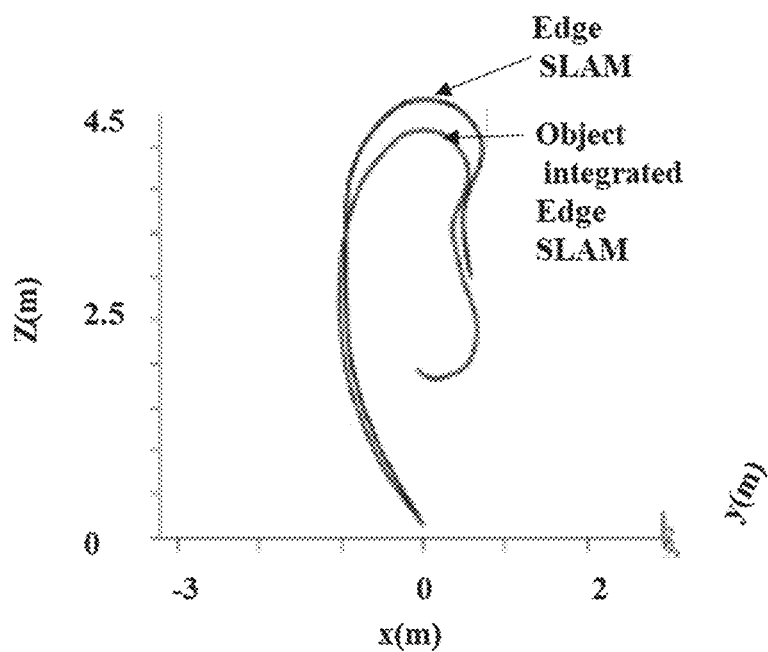
Figure 5C:
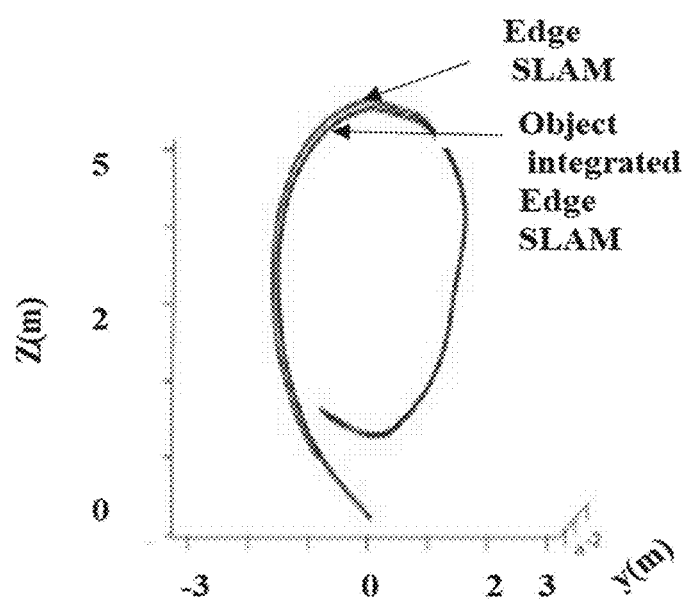

FIG. 5A to 5C illustrates a use case for integrating objects in monocular simultaneous localization and mapping (SLAM), in accordance with some embodiments of the present disclosure. The data sets comprising of three video sequences from robots operating in laboratory environments are taken where videos were taken from a micro aerial vehicle at a constant height above the floor and in all the three video sequences the robot traverses a loop and comes back to the starting position. Further the accumulated drift in camera localization of our method will be compared with that of edge SLAM, i.e. the deviation of the goal position from the starting position will be compared since drone comes very close to the starting position at the end of each run. In sequences 1 (FIG. 5A) and 2 (FIG. 5B), Edge SLAM goes into a degenerate condition for re sectioning where there are less 3D-2D correspondences between the existing 3D structure and 2D edge points and hence there is more drift in camera localization. The present disclosure shows this accumulated drift is seen to be substantially improved by using the joint optimization method as seen in sequences 1 (FIG. 5A) and 2 (FIG. 5B) and also marginally improved in sequence 3 (FIG. 5C) as can be seen quantitatively in Table 1 and qualitatively in FIG. 5A through FIG. 5C, where the blue trajectory corresponds to edge SLAM and the red trajectory to the proposed method. Further the 3D object localization errors are also tabulated and compared with ground truth in the Table 1.

TABLE 1

Quantitative results of different sequences.

| Seq | | Object localization error (meters) | | | Drift of trajectory (in meters) | | | |
| --- | --- | --- | --- | --- | --- | --- | --- | --- |
| | | | | | Edge SLAM | | Method (Object-integrated) | |
| ID | #objects | Best | worst | Avg | Z Dir | X-Dir | Z-Dir | X-Dir |
| 1 | 7 | 1.0779 | 3.4970 | 2.0094 | 0.1926 | 0.4983 | 0.0411 | 0.4163 |
| 2 | 5 | 1.3147 | 4.6887 | 2.377782 | 2.8255 | 0.5802 | 1.7815 | 0.7173 |
| 3 | 6 | 1.0231 | 4.4931 | 2.2726 | 1.4018 | 0.8117 | 1.3331 | 0.72111 |

Hence, the proposed system provides the joint optimization for objects as well as camera trajectory and 3D structure in the SLAM back-end. The proposed joint optimization provides a unified framework while ensuring advantages over conventional SLAM as in all the runs the drone's ending position is the same as it's starting location, and hence we calculate the drift between the starting position of the drone and it's ending position. The proposed disclosure is robust in both well textured and less textured environment, provides lesser drift than the classic edge SLAM and provides better semantic description of the map by localizing objects in 3D, thus creating a variety of applications in augmented reality and related fields. Further the proposed system uses the edge SLAM without loop closure for our purpose to portray the effectiveness of the proposed method, also the edge SLAM works well in such low-textured environments due to larger number of features and also in cases of lighting changes as the proposed object-SLAM is for indoor environments which is a low-textured environment. Further the joint framework can improve the camera localization as compared to Edge SLAM where the objects in the map is embedded along with the 3D structure obtained from the monocular SLAM framework, which gives a better and more meaningful visualization. The proposed optimization framework can be extended to other feature based monocular SLAM systems also and the category-specific model can be extended to other object categories as well.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read- It is intended that the disclosure and examples be considered as exemplary only, with a true scope of disclosed embodiments being indicated by the following claims.

What is claimed is:

1. A processor implemented method for integrating objects in monocular simultaneous localization and mapping (SLAM), the method comprising:
receiving, by one or more hardware processors, an input image sequence of an area of interest captured by an image sensing device;
performing, by the one or more hardware processors steps for bundle adjustment, the steps comprising:
a) identifying a plurality of key-frames in the input image sequence based on edge correspondences of 2D points between successive images frames in the input image sequence, wherein identifying the plurality of key-frames comprises:
performing key frame detection by detecting edges in a first frame and a second frame in the input image sequence, the input image sequence comprising a first image frame and a second image frame, wherein the first image frame and the second image frames are successive image frames and analyzing the first image frames and the second image frames;
performing correspondence detection by associating one or more edges in the first image frame and the second image frame;
identifying whether the second frame is a key-frame with respect to the first frame using the correspondence detection, wherein the key-frame refers to a frame from a subset of frames selected from the input image sequence;
selecting a successive frame to the second frame for determination of the key frame in response to the second frame not being identified as the key frame; and
repeating the key frame detection for the input image sequence to determine the plurality of key frames;
selecting one or more key frames from the plurality of key frames to increase processing speed of the key frame detection;
b) determining an initial pose of the image sensing device by obtaining rotation and translation of a second key-frame with respect to a first key-frame from the plurality of key-frames;
c) determining an initial 3D map of the area of interest using the initial pose, wherein the initial 3D map provides a plurality of initial 3D points;
d) obtaining a plurality of successive initial poses of the image sensing device based on a resection technique that utilizes the initial 3D map and edge correspondences of the 2D points in each of successive key-frames among the plurality of key-frames;
e) determining initializations of a plurality of successive 3D points for each of the successive key-frames using a triangulation technique, wherein the triangulation technique determines each of the edge correspondences between the 2D points of each of the successive key-frames, wherein the 3D map points are obtained using 2D-2D correspondences and relative pose between the frames, and selecting a next frame from the plurality of key-frames upon obtaining the initial 3D map; and
estimating each of the edge correspondences between the 3D points and the 2D points in a new key-frame along with new 2D-2D correspondences to find new edges in the key-frame which are not present in the initial 3D map, wherein two key-frames of the plurality of key-frames are defined as covisible key-frames having common visible 3D points; and
f) performing the bundle adjustment for the SLAM based on the initializations of the plurality of successive 3D points and the plurality of successive initial poses;
simultaneously performing, by the one or more hardware processors, object detection on the input image sequence using a bounding box-based cropping technique on objects in the input image sequences, key point detection of the objects and wireframe model fitting to the key points of the objects to obtain a plurality of shape parameters of the objects and a plurality of poses corresponding to each of the plurality of objects detected in the input image sequence;
performing, by the one or more hardware processors, the resection technique on 3D-2D edge correspondences to obtain a new key-frame pose using the 3D-2D edge correspondences and the triangulation technique on the new key-frame pose to obtain new 3D points in the map using the pose of the new key frame and the new 2D-2D edge correspondences, wherein the triangulation technique upon performing, adds new points in the initial 3D map whenever new edges of the 2D-2D edge correspondences are encountered, wherein the triangulation process comprises:
estimating correspondences between the 2D points by considering two key frames where: the relative pose between the two key frames is known, feature points in the two key frames are detected and the correspondence between the 2D points are estimated; and
performing, by the one or more hardware processors, a joint optimization by minimizing a resultant cost function to generate an optimized 3D map of the area of interest, wherein the joint optimization comprises adding constraints to the bundle adjustment by integrating the plurality of objects in the SLAM by applying the plurality of shape parameters of the objects and the plurality of poses corresponding to each of the plurality of objects detected in the input image sequence, wherein the joint optimization is performed on object localization, edges using a category level shape priors and the bundle adjustment, wherein the category level shape priors comprise shape parameters of the objects, the shape parameters being used to find the pose from the plurality of poses of the object and wherein the resultant cost function comprises:
a first cost function associated with the bundle adjustment for initializations of the plurality of successive 3D points and the plurality of successive initial poses; and
a second cost function associated optimization of the shape parameters of the objects and the plurality of poses corresponding to each of the plurality of objects, wherein an object optimization is added to a bundle adjustment of an edge SLAM by providing the joint optimization for edge 3D points, camera poses, the object shape parameters and the object poses together in a single optimization framework and wherein the bundle adjustment refers to optimization of the edge 3D points and the camera poses, wherein the joint optimization improves the object localization where the objects in the map are embedded along with 3D structure obtained from the monocular SLAM facilitating in an improved visualization, wherein the joint optimization provides lesser drift and improved semantic description of the initial 3D map by localizing the objects in 3D.

2. A system for integrating objects in monocular simultaneous localization and mapping (SLAM), the system comprising:

a memory storing instructions;

one or more Input/Output (I/O) interfaces; and one or more processor(s) coupled to the memory via the one or more I/O interfaces, wherein the one or more processor(s) are configured by the instructions to:

receive an input image sequence of an area of interest captured by an image sensing device;

perform steps for bundle adjustment, the steps comprising:

a) identifying a plurality of key-frames in the input image sequence based on edge correspondences of 2D points between successive images frames in the input image sequence, wherein identifying the plurality of key-frames comprises:

performing key frame detection by detecting edges in a first frame and a second frame in the input image sequence, the input image sequence comprising a first image frame and a second image frame, wherein the first image frame and the second image frames are successive image frames and analyzing the first image frames and the second image frames;

performing correspondence detection by associating one or more edges in the first image frame and the second image frame;

identifying whether the second frame is a key-frame with respect to the first frame using the correspondence detection, wherein the key-frame refers to a frame from a subset of frames selected from the input image sequence;

selecting a successive frame to the second frame for determination of the key frame in response to the second frame not being identified as the key frame; and repeating the key frame detection for the input image sequence to determine the plurality of key frames;

selecting one or more key frames from the plurality of key frames to increase processing speed of the key frame detection;

b) determining an initial pose of the image sensing device by obtaining rotation and translation of a second key-frame with respect to a first key-frame from the plurality of key-frames;

c) determining an initial 3D map of the area of interest using the initial pose, wherein the initial 3D map provides a plurality of initial 3D points;

d) obtaining a plurality of successive initial poses of the image sensing device based on a resection technique that utilizes the initial 3D map and edge correspondences of the 2D points in each of successive key-frames among the plurality of key-frames;

e) determining initializations of a plurality of successive 3D points for each of the successive key-frames using a triangulation technique, wherein the triangulation technique determines each of the edge correspondences between the 2D points of each of the successive key-frames, wherein the 3D map points are obtained using 2D-2D correspondences and relative pose between the frames, and selecting a next frame from the plurality of key-frames upon obtaining the initial 3D map;

estimating each of the edge correspondences between the 3D points and the 2D points in a new key-frame along with new 2D-2D correspondences to find new edges in the key-frame which are not present in the initial 3D map, wherein two key-frames of the plurality of key-frames are defined as covisible key-frames having common visible 3D points; and f) performing the bundle adjustment for the SLAM based on the initializations of the plurality of successive 3D points and the plurality of successive initial poses;

simultaneously perform object detection on the input image sequences using bounding box-based cropping technique on objects in the input image sequences, key point detection of the objects and wireframe model fitting to the key points of the objects to obtain a plurality of shape parameters of the objects and a plurality of poses corresponding to each of the plurality of objects detected in the input image sequence;

perform the resection technique on 3D-2D edge correspondences to obtain a new key-frame pose using the 3D-2D edge correspondences and the triangulation technique on the new key-frame pose to obtain new 3D points in the map using the pose of the new key frame and the new 2D-2D edge correspondences, wherein the triangulation technique upon performing, adds new points in the initial 3D map whenever new edges of the 2D-2D edge correspondences are encountered, wherein the triangulation process comprises:

estimating correspondences between the 2D points by considering two key frames where: the relative pose between the two key frames is known, feature points in the two key frames are detected and the correspondence between the 2D points are estimated; and perform a joint optimization by minimizing a resultant cost function to generate an optimized 3D map of the area of interest, wherein the joint optimization comprises adding constraints to the bundle adjustment by integrating the plurality of objects in the SLAM by applying the plurality of shape parameters of the objects and the plurality of poses corresponding to each of the plurality of objects detected in the input image sequence, wherein the joint optimization is performed on object localization, edges using a category level shape priors and the bundle adjustment, wherein the category level shape priors comprise shape parameters of the objects, the shape parameters being used to find the pose from the plurality of poses of the object and wherein the resultant cost function comprises:

a first cost function associated with the bundle adjustment for initializations of the plurality of successive 3D points and the plurality of successive initial poses; and a second cost function associated optimization of the shape parameters of the objects and the plurality of poses corresponding to each of the plurality of objects, wherein an object optimization is added to a bundle adjustment of an edge SLAM by providing the joint optimization for edge 3D points, camera poses, the object shape parameters and the object poses together in a single optimization framework and wherein the bundle adjustment refers to optimization of the edge 3D points and the camera poses, wherein the joint optimization improves the object localization where the objects in the map are embedded along with 3D structure obtained from the monocular SLAM facilitating in an improved visualization, wherein the joint optimization provides lesser drift and improved semantic description of the initial 3D map by localizing the objects in 3D.

3. One or more non-transitory machine-readable information storage mediums comprising one or more instructions, which when executed by one or more hardware processors causes a method for integrating objects in monocular simultaneous localization and mapping (SLAM), the method comprising:
receiving an input image sequence of an area of interest captured by an image sensing device;
performing steps for bundle adjustment, by the one or more hardware processors, the steps comprising:
a) identifying a plurality of key-frames in the input image sequence based on edge correspondences of 2D points between successive images frames in the input image sequence, wherein identifying the plurality of key-frames comprises:
performing key frame detection by detecting edges in a first frame and a second frame in the input image sequence, the input image sequence comprising a first image frame and a second image frame, wherein the first image frame and the second image frames are successive image frames and analyzing the first image frames and the second image frames;
performing correspondence detection by associating one or more edges in the first image frame and the second image frame;
identifying whether the second frame is a key-frame with respect to the first frame using the correspondence detection, wherein the key-frame refers to a frame from a subset of frames selected from the input image sequence;
selecting a successive frame to the second frame for determination of the key frame in response to the second frame not being identified as the key frame; and
repeating the key frame detection for the input image sequence to determine the plurality of key frames;
selecting one or more key frames from the plurality of key frames to increase processing speed of the key frame detection;
b) determining an initial pose of the image sensing device by obtaining rotation and translation of a second key-frame with respect to a first key-frame from the plurality of key-frames;
c) determining an initial 3D map of the area of interest using the initial pose, wherein the initial 3D map provides a plurality of initial 3D points;
d) obtaining a plurality of successive initial poses of the image sensing device based on a resection technique that utilizes the initial 3D map and edge correspondences of the 2D points in each of successive key-frames among the plurality of key-frames;
e) determining initializations of a plurality of successive 3D points for each of the successive key-frames using a triangulation technique, wherein the triangulation technique determines each of the edge correspondences between the 2D points of each of the successive key-frames, wherein the 3D map points are obtained using 2D-2D correspondences and relative pose between the frames, and selecting a next frame from the plurality of key-frames upon obtaining the initial 3D map;
estimating each of the edge correspondences between the 3D points and the 2D points in a new key-frame along with new 2D-2D correspondences to find new edges in the key-frame which are not present in the initial 3D map, wherein two key-frames of the plurality of key-frames are defined as covisible key-frames having common visible 3D points; and
f) performing the bundle adjustment for the SLAM based on the initializations of the plurality of successive 3D points and the plurality of successive initial poses;
simultaneously performing object detection on the input image sequence using a bounding box-based cropping technique on objects in the input image sequences, key point detection of the objects and wireframe model fitting to the key points of the objects to obtain a plurality of shape parameters of the objects and a plurality of poses corresponding to each of the plurality of objects detected in the input image sequence;
performing the resection technique on 3D-2D edge correspondences to obtain a new key-frame pose using the 3D-2D edge correspondences and the triangulation technique on the new key-frame pose to obtain new 3D points in the map using the pose of the new key frame and the new 2D-2D edge correspondences, wherein the triangulation technique upon performing, adds new points in the initial 3D map whenever new edges of the 2D-2D edge correspondences are encountered, wherein the triangulation process comprises:
estimating correspondences between the 2D points by considering two key frames where: the relative pose between the two key frames is known, feature points in the two key frames are detected and the correspondence between the 2D points are estimated; and
performing a joint optimization by minimizing a resultant cost function to generate an optimized 3D map of the area of interest, wherein the joint optimization comprises adding constraints to the bundle adjustment by integrating the plurality of objects in the SLAM by applying the plurality of shape parameters of the objects and the plurality of poses corresponding to each of the plurality of objects detected in the input image sequence, wherein the joint optimization is performed on object localization, edges using a category level shape priors and the bundle adjustment, wherein the category level shape priors comprise shape parameters of the objects, the shape parameters being used to find the pose from the plurality of poses of the object and wherein the resultant cost function comprises:
a first cost function associated with the bundle adjustment for initializations of the plurality of successive 3D points and the plurality of successive initial poses; and
a second cost function associated optimization of the shape parameters of the objects and the plurality of poses corresponding to each of the plurality of objects, wherein an object optimization is added to a bundle adjustment of an edge SLAM by providing the joint optimization for edge 3D points, camera poses, the object shape parameters and the object poses together in a single optimization framework and wherein the bundle adjustment refers to optimization of the edge 3D points and the camera poses, wherein the joint optimization improves the object localization where the objects in the map are embedded along with 3D structure obtained from the monocular SLAM facilitating in an improved visualization, wherein the joint optimization provides lesser drift and improved semantic description of the initial 3D map by localizing the objects in 3D.

\* \* \* \* \*